United States Patent [19]

Parsons et al.

[11] 4,044,873
[45] Aug. 30, 1977

[54] DRIVEN PLATES FOR FRICTION CLUTCHES

[75] Inventors: David Parsons; Keith Vernon Leigh-Monstevens, both of Leamington Spa, England

[73] Assignee: Automotive Products Company Ltd., England

[21] Appl. No.: 642,786

[22] Filed: Dec. 22, 1975

[30] Foreign Application Priority Data

Dec. 31, 1974 United Kingdom .............. 56233/74

[51] Int. Cl.² .............................................. F16D 3/66
[52] U.S. Cl. ................................. 192/106.2; 403/359
[58] Field of Search ............ 192/106.1, 106.2, 107 C, 192/107 R; 403/359, 298

[56] References Cited

U.S. PATENT DOCUMENTS 3,938,635  2/1976  Davies et al. ...................... 192/106.2

FOREIGN PATENT DOCUMENTS

1,112,673  8/1961  Germany .............................. 403/359
2,159,264  6/1973  Germany .............................. 403/359
1,277,006  6/1972  United Kingdom ................. 403/359

Primary Examiner—Benjamin W. Wyche
Attorney, Agent, or Firm—Lawrence J. Winter

[57] ABSTRACT

This invention relates to clutch driven plates having an annular component which carries the friction facings and which is mounted for limited rotary movement on a hub so that it extends between a pair of radially extending discs which are fixed to the hub by engagement of serrations formed at their inner peripheral edges in grooves in the hub. The hub has three spaced annular rims which co-operate to form two spaced annular grooves. The two outer rims taper outwardly and the central rim, which is cylindrical, locates a cylindrical spacer which spaces the disc apart. The grooves which receive the serrations are formed in the outer rims. During assembly of the clutch driven plate, the discs are forced axially on to the hub. The grooves are cut by the serrations during assembly and the material that is cut from each rim of the hub by the formation of the grooves is directed into the adjacent annular groove. Once the disc are located against the spacer, the hub is deformed to retain the discs on the hub.

14 Claims, 7 Drawing Figures

DRIVEN PLATES FOR FRICTION CLUTCHES

This invention relates to driven plates for friction clutches of the type in which friction facings of the driven plate to engage with the driving surfaces of the c;lutch are carried by an annular friction facing carrier mounted for limited rotational movement on a hub, resilient means being provided to oppose relative movement of the annular component and hub and to tend to locate the annular friction facing carrier substantially at the centre of its range of rotational movement relative to the hub, and comprises an improvement in or modification of the clutch driven plate which is described and illustrated in published British Pat. Specification No. 1,438,661 said published British Pat. Specification No. 1,438,661 discloses and illustrate a clutch-driven plate comprising an annular friction facing carrier mounted for limited rotational movement on a hub, two radially extending annular disc-like members fixed in relation to the hub, said annular friction facing carrier comprising a radially inner portion extending between said disc-like members and an outer peripheral portion which carries said friction facings, registering openings being formed in said radially inner portion of said annular friction facing carrier and in said disc-like members, and resiliently compressible members being mounted in said registering openings to oppose said limited rotational movement, and a fixing arrangement fixing at least one of said annular disc-like members directly and non-rotatably to the hub, wherein the said at least one annular disc-like member has its inner peripheral edge formed of a material which differs in hardness from the material of that part of the hub to which it is fixed and the fixing arrangement comprises serrations formed on whichever one of the said inner peripheral edge of the annular disc-like member and the said hub part that is formed of the harder material, the said serrations being engaged with corresponding grooves formed in the other one of said inner peripheral edge of said annular disc-like member and said hub part by the serrations as said at least one annular disc-like member was forced axially on to the hub member during assembly, so that said one annular disc-like member is fixed against rotation on the hub by the engagement of the serrations in the respective grooves.

The object of the present invention is to further improve manufacture of a driven clutch plate of the kind which is described and illustrated in published British Pat. Specificatin No. 1,438,661.

According to one aspect of this invention there is provided an annular hub component for assembly with an annular friction facing carrier and two annular disc-like members to form a clutch driven plate in which the annular friction facing carrier is mounted for limited rotatinal movement on the hub component and the two annular disc-like members are fixed directly and nonrotatably to the hub component so that they extend radially from the hub component, at least one of said annular disc-like members being fixed directly and non-rotatably to the hub component by a fixing arrangement which comprises serrations formed on the inner peripheral edge of said at least one annular disc-like member and engaged in corresponding grooves formed in the hub component, wherein the annular hub component has at least one radially outwardly projecting annular rim which has a frusto-conical outer peripheral surface portion which tapers towards one of the axially spaced ends of said annular hub component, the smaller diameter end of the frusto-conical peripheral surface portion being at the end of said annular rim which is nearer to said one axially spaced end of said annular hub component.

Preferably the annular hub component has two such radially outwardly projecting rims which are spaced from one another axially, each of said annular rims having such a frusto-conical outer peripheral surface portion and the two rims being arranged so that the two frusto-conical outer peripheral surface portions taper in opposite directions. Moreover the preferred form of annular hub component in which this invention is embodied has a third annular rim between the two annular rims that have frusto-conical outer peripheral surface portions, the third annular rim having a cylindrical outer surface portion and being spaced from each of the other two annular rims.

Conveniently the axial length of the or each frusto-conical outer peripheral surface portion is greater than the difference between the diameter of the axially spaced ends of that surface portion and the or each frusto-conical outer peripheral surface portion extends over the total axial length of the radially outer surface of the respective annular rim.

According to another aspect of this invention there is provided a combination of an annular disc-like member and an annular hub component for assembly together with the annular friction facing carrier and another annular disc-like member to form a clutch driven plate in which the annular friction facing carrier is mounted for limited rotational movement on the hub component and the two annular disc-like members are fixed directly and non-rotatably to the hub component so that they extend radially from the hub component, at least the annular disc-like member of said combination being fixed directly and non-rotatably to the hub by a fixing arrangement which comprises serrations formed on the inner peripheral edge of the respective disc-like member and engaged in corresponding grooves formed in the hub component, wherein the annular hub component has at least one radially outwardly projecting annular rim which is formed of a material which is softer than is the material from which the serrated inner peripheral edge of the annular disc-like member of said combination is formed, the or each annular rim having a frusto-conical peripheral surface portion which tapers towards a respective one of the axially spaced ends of said annular hub component, the smaller diameter end of the or each frusto-conical peripheral surface portion being at the end of the respective annular rim which is nearer to the respective one of the axially-spaced ends of said annular hub component and having a diameter which is larger than the pitch circle diameter of the radially innermost parts of the serrations, the diameter of each of said axially-spaced ends being less than the pitch circle diameter of the radially innermost parts of the serrations of the annular disc-like member of said combination, the arrangement being such that, in order to fix the annular disc-like member of said combination to said annular hub component during assembly of the clutch driven plate, that annular disc-like member is passed over the respective one of the axially spaced ends of the hub component, so that the respective one of the axially spaced ends of the annular hub component projects through the central aperture of that annular disc-like member, and is forced onto the respective annular rim from the smaller diameter end thereof so that the serrations cut grooves in the frusto-conical outer peripheral surface of the respective annular rim and remain engaged in the grooves so cut thus securing that annular disc-like member against rotation relative to the hub component.

According to a further aspect of this invention there is provided a combination of an annular hub component and a pair of annular disc-like members for assembly together with an annular friction facing carrier to form a clutch driven plate in which the annular friction facing carrier is mounted for limited rotational movement on the hub component and the two annular disc-like members are fixed directly and non-rotatably to the hub component so that they extend radially from the hub component, the annular disc-like members of this combination being fixed directly and non-rotatably to the hub by a fixing arrangement which comprises serrations formed on the inner peripheral edge of each disc-like member and engaged in corresponding grooves formed in the hub component, wherein the annular hub component has two radially outwardly projecting annular rims which are formed of a material which is softer than is the material from which the serrated inner peripheral edges of both said annular disc-like members are formed, each of said annular rims, which are spaced from one another axially, having a frusto-conical peripheral surface portion which tapers towards a respective one of the axially spaced ends of said annular hub component so that the two rims taper in opposite directions, the smaller diameter end of each of the frusto-conical peripheral surface portions being at the end of the respective annular rim which is nearer to the respective one of the axially spaced ends of said annular hub component and having a diameter which is larger than the pitch circle diameter of the radially innermost parts of the serrations of the respective annular disc-like member, the pitch circle diameter of the radially innermost parts of the serrations in turn being larger than the diameter of each of the axially spaced ends of said annular hub component, the arrangement being such that in order to fix the annular disc-like members of this combination to the annular hub component during assembly of the clutch driven plate one of the annular disc-like members is passed over one of the axially spaced ends of the hub component so that said one axially spaced end of the hub component projects through the central aperture of that annular disc-like member, and the other annular disc-like member is passed over the other axially spaced end of the annular hub component so that said other axially spaced end of the annular hub component projects through the central aperture of said other annular disc-like member, and each annular disc-like member is forced onto the nearer one of the two annular rims from the smaller diameter end of that rim so that the serrations in each annular disc-like member cut grooves in the respective annular rim and remain engaged in those grooves thus securing each annular disc-like member against rotation relative to the hub component. Where the hub component has a third annular rim which is formed between the two annular rims that have frusto-conical outer peripheral surface portions, the third annular rim having a cylindrical outer surface portion and being spaced from the other two annular rims, the third annular rim is for providing radial location for the annular friction facing carrier and for annular spacing means which space the annular friction facing carrier from one of the annular disc-like members in the resultant clutch driven plate.

According to yet another aspect of this invention there is provided a clutch driven plate comprising an annular friction facing carrier mounted for limited rotational movement on a hub component, two radially extending annular disc-like members which are fixed directly and non-rotatably in relation to the hub component so that they extend radially from the hub component, registering openings which are formed in said annular friction facing carrier and in said disc-like members, resiliently compressible members which are mounted in said registering openings to oppose said limited rotational movement, and a fixing arrangement by which each of said disc-like members is fixed directly and non-rotatably to the hub component, the fixing arrangement for each disc-like member comprising serrations formed on the inner peripheral edge of that disc-like member and engaged in grooves formed in the hub component, the serrated inner peripheral portion of each disc-like member being formed of a material which is harder than is the material of the hub, wherein the grooves within which the serrations of each disc-like member are engaged have their ends which are nearer to the other disc-like member in open communication with an annular groove which is formed within the hub component.

Preferably there are two such annular grooves which are formed by the hub component and which are spaced apart axially by a central annular rim.

Conveniently the central annular rim has a cylindrical outer peripheral surface and provides radial location for the annular friction facing carrier and for annular spacing means which space the two disc-like members apart. Also conveniently the annular spacing means extend across at least one of the annular grooves towards the respective disc-like member. The radially inner surface of that part of the annular spacing means that extends across the or each annular grooves may be tapered outwardly from the central annular rim towards the respective disc-like member. The smaller diameter end of each of the frusto-conical outer peripheral surface portions may be coincident with the respective end of the respective annular rim.

One embodiment of this invention will be described now by way of example with reference to the accompanying drawings, in which.

Figure 1:
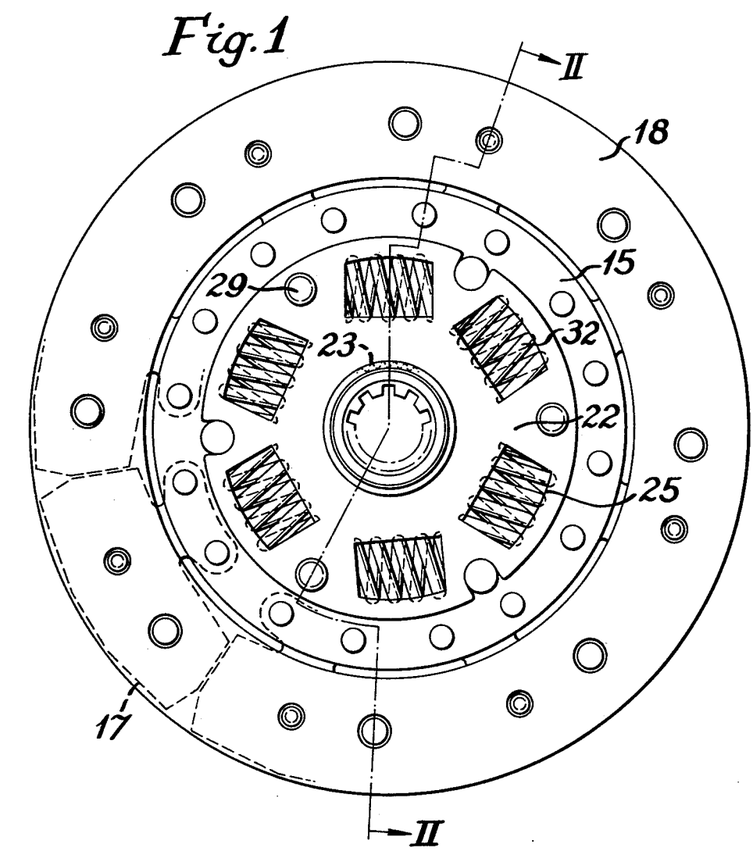
FIG. 1 is a front elevation of one form of clutch driven plate in which this invention is embodied.
Figures 2, 3:
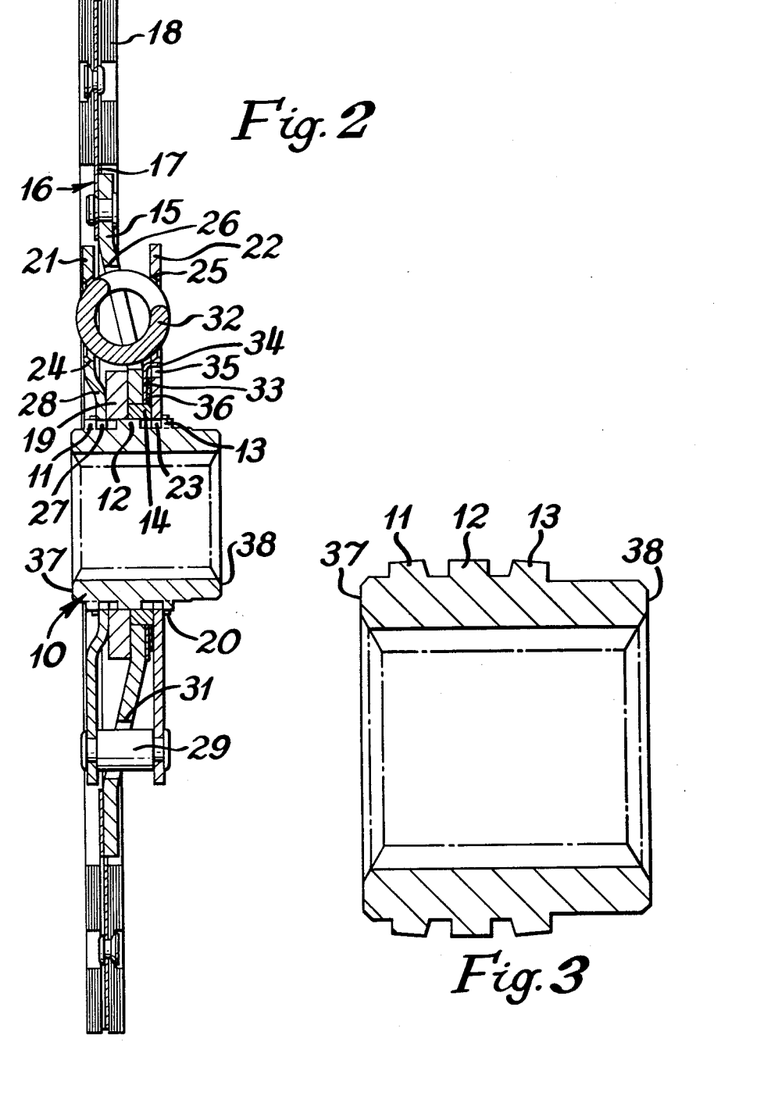
FIG. 2 is a section on the line II—II of FIG. 1.
FIG. 3 is a section similar to that shown in FIG. 2 of the hub component of the clutch driven plate prior to assembly of the clutch driven plate, and is drawn to a larger scale than FIG. 2.

Referring to FIGS. 1 and 2 of the drawings, an internally-splined tubular hub 10 has three radially-outwardly projecting annular rims 11, 12 and 13 which are spaced apart axially so that two axially-spaced annular recesses are formed between them. A spacer sleeve 14 which is fitted over part of the central annular rim 12 so as to extend towards the outer annular rim 13 across the annular recess which is formed between the rims 12 and 13, locates coaxially with the hub 10, a rigid dished annular steel disc 15 which forms the radially inner portion of an annular friction facing carrier 16. The outer peripheral portion of the annular friction facing carrier 16 comprises a series of resilient metal cushion members 17 rivetted to the disc 15 and supporting friction facings 18 in the conventional manner. An annular spacer 19 which is fitted over the remainder of the central annular rim 12 so as to extend towards the other outer annular rim 11 across the annular recess which is formed between the rims 11 and 12, has a greater radial dimension than does the spacer sleeve 14 and abuts the spacer sleeve 14 and a flat central portion of the concave face of the dished disc 15.

Two annular disc-like members 21 and 22 of sheet metal are serrated at their inner peripheral edges, the serrations 23 that are formed on the disc-like member 22 being shown in FIG. 1. Each disc-like member 21, 22 is provided with a circular series of substantially rectangular windows 24, 25 near its outer periphery corresponding windows 26, of greater radial width than the windows 24, 25 being formed in the disc 15.

The disc-like members 21 and 22 are formed of harder metal than the hub 10. They are secured to the hub 10, in axially-spaced location, by forcing each of them onto the outer ends of a respective one of the outer annular rims 11 and 13 of the hub 10, the annular spacer 19 and the spacer sleeve 14 being between them, so that the serrations 27, 23 cut grooves in the respective outer annular rim 11, 13 and remain engaged in the grooves so cut, thus securing the disc-like members 21 and 22 against rotation of the hub 10. The annular disc-like members 21 and 22 are held against the respective adjacent end of the spacer sleeve 14 or the annular sleeve 19 by staking the material of the outer portion of the respective annular rim 11, 13 of the hub 10 as shown at 20 in FIG. 2.

The disc-like member 22, as shown in FIG. 2, is flat, but the disc-like member 21 is formed with a circumferential step at 28 for installation purposes. Each of a series of circumferentially-spaced stop pins 29 extends between the disc-like members 21 and 22 through a respective one of a series of circumferentially-spaced apertures 31 formed in the rigid disc 15. Each stop pin 29 is rivetted at one end to the disc-like member 21 and at the other end to the disc-like member 22. The stop pins 29 function in a conventional manner to limit relative angular movement between the rigid disc 15 and the disc-like members 21 and 22 which are fixed to the hub 10.

When the clutch plate is being assembled, coiled compression springs 32 are mounted in the well known manner in the windows 24, 25 and 26, to provide resilient resistance to relative rotational movement of the hub 10 and the friction facing carrier 16. The windows 24 and 25 have a radial width less than the diameter of the springs 32, so that the disc-like members 21 and 22 retain the springs 32 in position in the windows 24, 25 and 26.

Frictional damping of the relative rotational movement of the annular friction facing carrier 16 and the hub 10 is provided, in the known manner, by the action of a steel pressure plate 33 which is held against rotation relative to the disc-like member 22 by a tongue 34 on that pressure plate 33 which enters a hole 35 in the disc-like member 22, a Belleville washer 36 being mounted between the pressure plate 33 and the disc-like member 22 to apply axial pressure to the pressure plate 33 so as to urge it into frictional engagement with the flat central portion of the convex face of the dished disc 15.

FIG. 3 shows the form of the tubular hub 10 before assembly of the clutch driven plate which is shown in FIGS. 1 and 2.

It will be appreciated that the three axially-spaced annular rims 11, 12 and 13 comprise circumferentially continuous solids of revolution. Each of the outer annular rims 11 and 13 tapers towards the nearer one of the two axially spaced ends 37 and 38 of the tubular hub component 10. Thus the two annular rims 11 and 13 taper in opposite directions and each has a frusto-conical outer peripheral surface. The angle of taper of each rim 11, 13 is such that the axial length of each annular rim 11, 13 is significantly greater than the difference between the radii of the larger and smaller diameter ends of that rim 11, 13. The central annular rim 12 is cylindrical.

The end portions of the tubular hub component 10 which extend from each of the outer annular rims 11 and 13 to the adjacent end 37, 38 of the hub component 10, are cylindrical and their outside diameter is less than the diameter of the circle on which lie the tips of the serrations 23, 27 of the disc-like members 21 and 22 which are to be assembled with the hub component 10 to form a clutch driven plate as described above with reference to and as shown in FIGS. 1 and 2. On the other hand the diameter of each of the smaller diameter ends of the tapered outer annular rims 11 and 13 is greater than the diameter of the circle on which the tips of the serrations 23, 27 lie.

Figure 4:
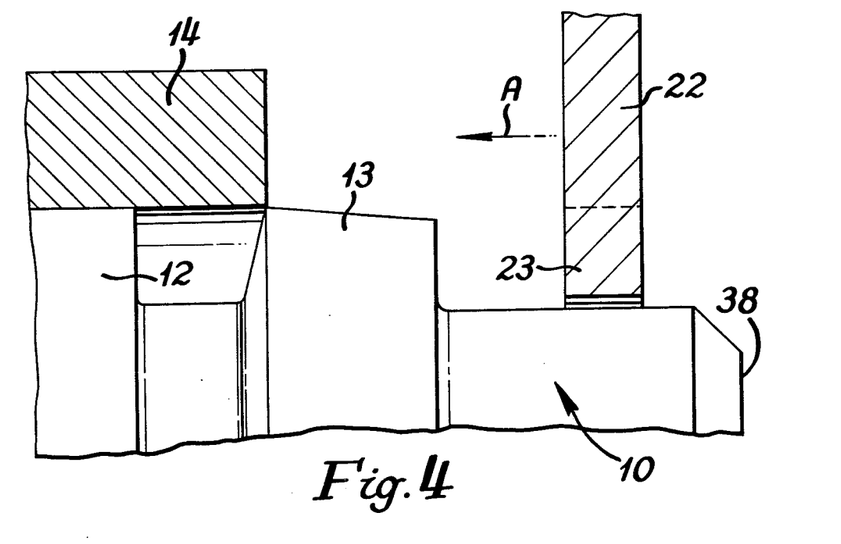
FIG. 4 is a fragmentary view in elevation of part of the hub component shown in FIG. 3 drawn to a larger scale than FIG. 3.
Figure 5:
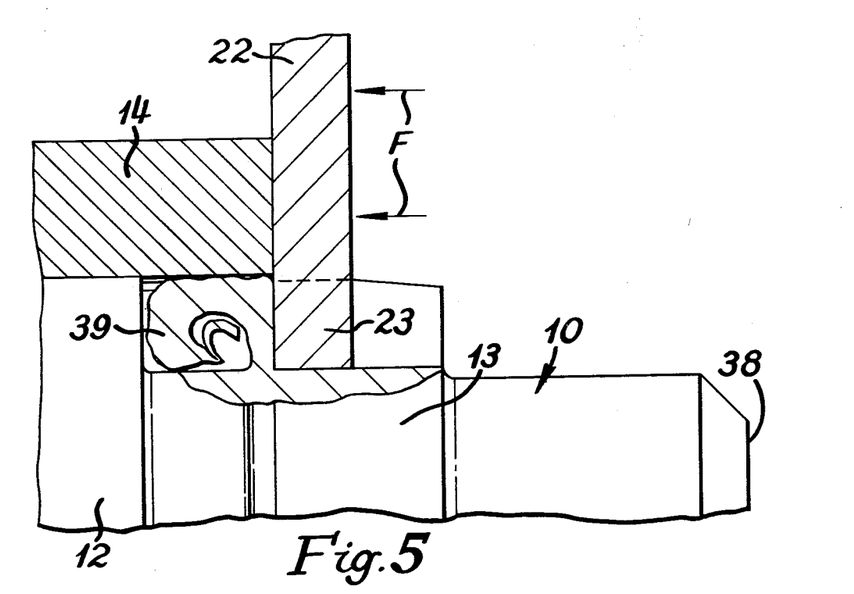
FIGS. 5 and 6 are views similar to FIG. 4 which illustrate part of the assembly of the clutch driven plate.

Assembly of the clutch driven plate that is described above with reference to FIGS. 1 and 2 will be described now with reference to FIGS. 4, 5 and 6. The annular disc-like member 22 is passed over the end 38 of the tubular hub component 10 in the direction of arrow A as shown in FIG. 4 so that the respective cylindrical end portion of the tubular hub component 10 projects through the central aperture of that annular disc-like member 22. When the inner peripheral portion of that annular disc-like member 22 is brought into abutment with the smaller diameter radial end face of the outer annular rim 13, an axial load F is applied to that annular disc-like member 22 to force it onto that annular rim 13. Thus the serration 23 which are formed by the inner peripheral edge of that annular disc-like member 22 act as a single-point cutting tool and cut corresponding axially extending grooves in that annular rim 13, and, as is shown in FIG. 5, the metal cut from that annular rim 13 by each serration 23 forms a tightly-curled chip 39 which curls into the annular recess that is formed between that outer annular rim 13 and the central annular rim 12. Resultant plastic deformation of those parts of the outer annular rim 13 which separate juxtaposed axial grooves that are cut by the serrations 23 of the annular disc-like member 22, is negligible.

Figure 6:
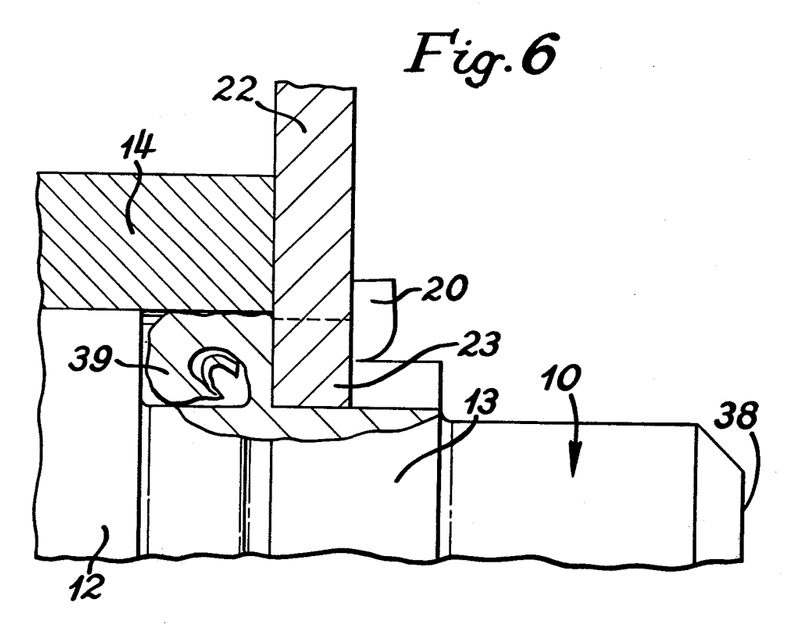

When the annular disc-like members 22 has been forced over the whole length of the respective outer annular rim 13 so that the axial grooves that it cuts in the annular rim 13 are in open communication with the annular recess that is formed between that outer annular rim 13 and the central annular rim 12, the outer ends of that annular rim 13 are staked over as shown at 20 in FIG. 6 to retain that annular disc-like member 22 against withdrawal towards the respective adjacent end 38 of the tubular hub component 10, that annular disc-like member 22 having its serrations 23 engaged in the axial grooves they have cut so that that annular disc-like member 22 is fixed against rotation relative to the tubular hub component 10. The radial face of that annular disc-like member 22 remote from the outer end of that annular rim 13 is flush with the inner end of that annular rim 13. The outer ends of that annular rim 13 may be staked over by rolling or by axial compression.

Once the annular disc-like member 23 has been fixed to the tubular hub component 10 as described above, the annular spacer 19, the spacer sleeve 14, the annular friction facing carrier 16 and the coil springs 32 can be fitted into position whereafter assembly of the clutch drive plate is completed by fitment of the other annular disc-like member 21, onto the other outer annular rim 11, in a manner similar to the manner in which the annular disc-like member 22 was so fixed and which has just been described in full, the annular spacer 19, the spacer sleeve 14 and the annular friction facing carrier 16 being located axially between the two annular disc-like members 21 and 22. The disc-like member 22 has just been described as being fitted to the hub component 10 before the other disc-like member 11 for the sake of convenience in that description. The disc-like member 21 may be fitted to the hub component 10 before the disc-like member 22 is so fitted if desired.

It is not essential for each outer annular rim 11, 13 to be tapered over its whole axial length. However it is thought that the smaller diameter end of the tapered portion of such an outer annular rim 11, 13 should be coincident with the end of that annular rim 11, 13 which is nearer to the respective adjacent end 37, 38 of the tubular hub component 10.

The annular spacer 19, the spacer sleeve 14, the annular friction facing carrier 16 and the coil springs 32 can be fitted into position upon the tubular hub component 10 before either of the annular disc-like members 21 and 22 is fitted onto the respective annular rim 11, 13 in a manner similar to the member in which the first annular disc-like member 21, 22 was so fixed as described above.

Figure 7:
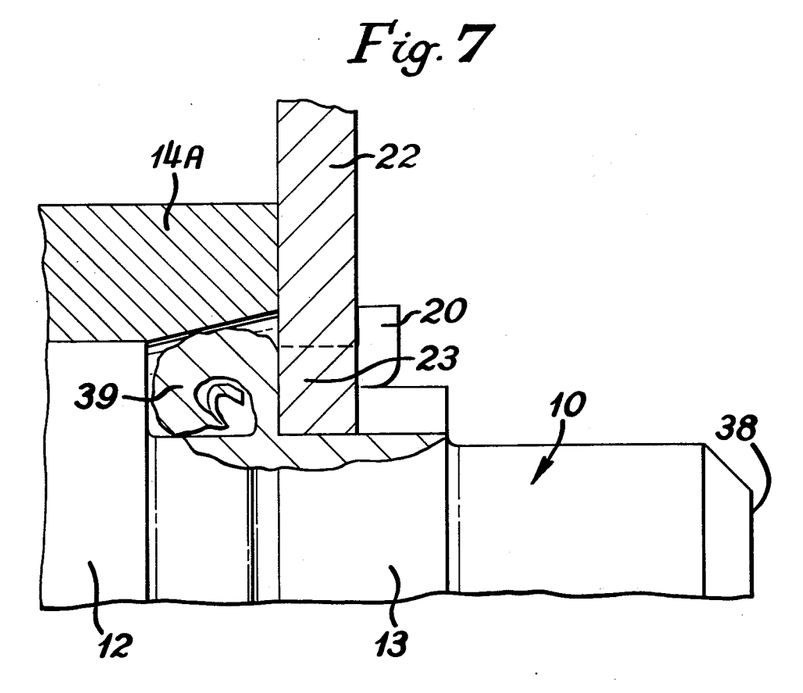
FIG. 7 is a view similar to FIG. 6 showing a modification.

FIG. 7 illustrates a modification of the clutch driven plate that has been described above with reference to FIGS. 1 to 6 in which the spacer sleeve 14 is replaced by a modified form of spacer sleeve 14A. The radially inner surface of the spacer sleeve 14A tapers outwardly at its end which is nearer to the adjacent end 38 of the tubular hub component 10. If such a modified form of spacer sleeve 14A is fitted onto the tubular hub component 10 before the annular disc-like member 22 is fixed upon the hub component 10, curling of the chip 39 into the annular recess that is formed between the annular rims 12 and 13 is enhanced by the tapered portion of the spacer sleeve 14A. The radially inner surface of the annular spacer 19 may taper outwardly at its end which is nearer to the adjacent end 37 for a similar purpose.

What we claim is:

1. An annular hub component for assembly with an annular friction facing carrier and two annular disc-like members forming a clutch driven plate with said annular friction facing carrier being mounted for limited rotational movement on said hub component and said two annular disc-like members fixed directly and non-rotatably to said hub component to extend radially from said hub component, at least one of said annular disc-like members being fixed to said hub component by a fixing arrangement which comprises serrations formed on the inner peripheral edge of at least one annular disc-like member and engaged in corresponding grooves formed in said hub component, wherein said annular hub component has at least one radially outwardly projecting annular rim with a frusto-conical outer peripheral surface extending over the total axial length of the radially-outer surface of the respective annular rim, the smaller diameter end of said frusto-conical outer peripheral surface portion being nearer to the adjacent end of said hub component toward which said frusto-conical outer peripheral surface portion tapers.

2. An annular hub component as claimed in claim 1, which has two such radially outwardly projecting annular rims which are spaced from one another axially, each of said annular rims having such a frusto-conical outer peripheral surface so that the two frusto-conical outer peripheral surfaces taper in opposite directions.

3. An annular hub component as claimed in claim 2, which has a third annular rim between the two annular rims that have frusto-conical outer peripheral surface portions, the third annular rim having a cylindrical outer surface portion and being spaced from each of the other two annular rims.

4. An annular hub component as claimed in claim 1, wherein the axial length of each frusto-conical outer peripheral surface is greater than the difference between the diameter of the axially spaced ends of that surface.

5. An annular hub component for assembly with an annular friction facing carrier and two annular disc-like members forming a clutch driven plate, said annular friction facing carrier being mounted for limited rotational movement on said hub component, said two annular disc-like members fixed directly and non-rotatably to said hub component to extend radially from said hub component, said annular disc-like members being fixed by a fixing arrangement comprising serrations formed on the inner peripheral edge of each of said annular disc-like members and engaged in corresponding grooves formed in the hub component, wherein said annular hub component has two radially-outwardly projecting annular rims spaced from one another axially, each of said annular rims having a frusto-conical outer peripheral surface portion tapering toward an adjacent one of the axially spaced ends of said annular hub component said two frusto-conical outer peripheral surface portions tapering in opposite directions, the smaller diameter end of the frusto-conical peripheral surface portions of each annular rim being at the end the annular rim nearer to the adjacent one of the axially spaced ends of said annular hub component, and a third annular rim between the two annular rims that have frusto-conical outer peripheral surface portions having a cylindrical outer surface portion and being spaced from each of said other two annular rims.

6. An annular hub component as claimed in claim 5, wherein the axial length of each frusto-conical outer peripheral surface portion is greater than the difference between the diameter of the axially spaced ends of that surface portion.

7. An annular hub component as claimed in claim 5, wherein each frusto-conical outer peripheral surface portion extends over the total axial length of the radially outer surface of the respective annular rim.

8. A combination of an annular hub component and a pair of annular disc-like members for assembly together with an annular friction facing carrier to form a clutch driven plate in which the annular frictio facing carrier is mounted for limited rotational movement on the hub component and the two annular disc-like members are fixed directly and non-rotatably to the hub component so that they extend radially from the hub component, the annular disc like members of this combination being fixed directly and non-rotatably to the hub by a fixing arrangement which comprises serrations formed on the inner peripheral edge of each disc-like member and engaged in corresponding grooves formed in the hub component, wherein the annular hub component has two radially outwardly projecting annular rims which are formed of a material which is softer than is the material from which the serrated inner peripheral edges of both said annular disc-like members are formed, each of said annular rims, which are spaced from one another axially, having a frusto-conical peripheral surface portion which tapers towards a respective one of the axially spaced ends of said annular hub component so that the two rims taper in opposite directions, the smaller diameter end of each of the frusto-conical peripheral surface portions being at the end of the respective annular rim is nearer to the respective one of the axially spaced ends of said annular hub component and having a diameter which is larger than the pitch circle diameter of the radially innermost parts of the serrations of the respective annular disc-like members the pitch circle diameter of the radially innermost parts of the serrations in turn being larger than the diameter of each of the axially spaced ends of said annular hub component, the arrangement being such that in order to fix the annular disc-like members of this combination to the annular hub component during assembly of the clutch driven plate one of the annular disc-like members is passed over one of the axially spaced ends of the hub component so that said one axially spaced end of the hub component projects through the central aperture of that annular disc-like member, and the other annular disc-like member is passed over the other axially spaced end of the annular hub component so that said other axially spaced end of the annular hub component projects through the central aperture of said other annular disc-like member, and each annular disc-like member is forced onto the nearer one of the two annular rims from the smaller diameter end of that rim so that the serrations in each annular disc-like member cut grooves in the respective annular rim and remain engaged in those grooves thus securing each annular disc-like member against rotation relative to the hub component.

9. A combination as claimed in claim 8, wherein the hub component has a third annular rim which is formed between the two annular rims that have frusto-conical outer peripheral surface portions, the third annular rim having a cylindrical outer surface portion and being spaced from the other two annular rims, the third annular rim being for providing radial location for the annular friction facing carrier and for annular spaciing means which space the annular friction facing carrier from one of the annular disc-like members in the resultant clutch driven plate.

10. A clutch driven plate comprising an annular friction facing carrier mounted for limited rotational movement on a hub component, two radially extending annular disc-like members fixed directly and non-rotatably in relation to the hub component to extend radially from said hub component, registering openings disposed in said annular friction facing carrier and in said disc-like members, resiliently compressible members mounted in said registering openings to oppose said limited rotational movement, and a fixing arrangement by which each of said disc-like members is fixed directly and non-rotatably to said hub component comprising serrations formed on the inner peripheral edge of said disc-like member and engaged in grooves formed in said hub component, the serrated inner peripheral portion of each disc-like member being formed of a material which is harder than the hub material, wherein a pair of annular grooves are formed in said hub component between one set of grooves in which the serrations on the inner peripheral edge of one of said two annular disc-like members are engaged, and another set of grooves in which the serrations on the inner peripheral edge of the other annular disc-like member are engaged, a central annular rim formed by the hub component spaces the two annular grooves apart axially, the grooves of each set having their ends nearer to the other set of grooves in open communication with the adjacent one of said two annular grooves, and annular spacing means spacing said two annular disc-like members apart and extending across at least one of said annular grooves toward the respective disc-like member, said central annular rim providing radial location for said annular spacing means.

11. A clutch driven plate as claimed in claim 10, wherein the central annular rim has a cylindrical outer peripheral surface.

12. A clutch driven plate as claimed in claim 10, wherein the central annular rim provides radial location for the annular friction facing carrier.

13. A clutch driven plate as claimed in claim 10, wherein the radially inner surface of that part of the annular spacing means that extends across each annular groove is tapered outwardly from the central annular rim towards the respective disc-like member.

14. A clutch driven plate as claimed in claim 10, wherein the hub component has two radially outwardly projecting annular rims which are spaced from one another axially and from the central annular rim which is between them, each of the outer annular rims having a frusto-conical outer peripheral surface portion which tapers towards the respective one of the axially spaced ends of said annular hub component, the larger diameter end of each of the frusto-conical outer peripheral surface portions being at the end thereof which is nearer to the central annular rim so that the two rims taper in opposite directions.

* * * * *

UNITED STATES PATENT OFFICE
CERTIFICATE OF CORRECTION

Patent No. 4,044,873                         Dated Aug. 30, 1977

Inventor(s) David Parsons et al.

It is certified that error appears in the above-identified patent and that said Letters Patent are hereby corrected as shown below:

On the cover sheet, the assignee should read

-- Automotive Products Ltd. --.

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*